United States Patent
Lofts

(10) Patent No.: US 7,135,700 B2
(45) Date of Patent: Nov. 14, 2006

(54) METHOD AND SYSTEM FOR BINARY SIGNALING VIA QUANTUM NON-LOCALITY

(76) Inventor: Mark Lofts, Unit 3, 18 Kintail Road, Applecross, Western Australia (AU) 6153

(*) Notice: Subject to any disclaimer, the term of this patent is extended or adjusted under 35 U.S.C. 154(b) by 0 days.

(21) Appl. No.: 11/000,378

(22) Filed: Nov. 10, 2004

(65) Prior Publication Data

US 2006/0226418 A1 Oct. 12, 2006

Related U.S. Application Data

(63) Continuation of application No. 10/108,084, filed on Mar. 26, 2002, now abandoned.

(30) Foreign Application Priority Data

Mar. 28, 2001 (AU) .................................. PR4059

(51) Int. Cl.
*H01L 31/00* (2006.01)
*G02B 6/00* (2006.01)

(52) U.S. Cl. ......................... 257/24; 385/147
(58) Field of Classification Search ................ None
See application file for complete search history.

(56) References Cited

U.S. PATENT DOCUMENTS

| | | | |
|---|---|---|---|
| 5,243,649 A | 9/1993 | Franson | |
| 6,057,541 A | 5/2000 | Steenblik | |
| 6,473,719 B1 * | 10/2002 | Steenblik | 702/181 |
| 6,522,749 B1 | 2/2003 | Wang | |
| 2003/0173498 A1 * | 9/2003 | Blais et al. | 250/208.1 |

FOREIGN PATENT DOCUMENTS

CA  2 148 337  11/1996

OTHER PUBLICATIONS

Sears, Zemansky and Young, University Physics, 1983, Addison-Wesley, 6th Edition, pp. 870-874.*
Popper. "Realism in quantum mechanics and a new version of the EPR experiment". In Open Questions in Quantum Physics. Tarozzi et al. (Eds.), D. Residel Publishing Company: Dordrecht (1985).*
Popper. Quantum theory and the Schism in Physics. Routledge (1982).*

(Continued)

*Primary Examiner*—Michelle Connelly-Cushwa
*Assistant Examiner*—Eric Wong
(74) *Attorney, Agent, or Firm*—Merchant & Gould P.C.

(57) ABSTRACT

A method of, and system for, binary signalling via quantum non-locality. The method and system are particularly suitable for rapid communication including superluminal signalling. The method and system use an ensemble of quantum-systems in which the quantum-systems are in pairs, with one quantum-system of each pair being in quantum entanglement with the other quantum-system of each pair. The quantum-systems may comprise particles or parts of particles. The paired quantum-systems are separated into two subgroups, with the quantum-systems of each pair being in different subgroups. The quantum-systems in one subgroup are subjected to an influence, such as a slit, to enhance scattering of the quantum-systems to an extent corresponding to the selected binary signal to be transmitted. The extent of correlated scattering in the quantum-systems in the other subgroup is then detected, the extent of scattering providing an indication of the particular binary signal transmitted. Detection of the extent of correlated scattering involves subjecting the quantum-systems in the other subgroup to a detector slit.

28 Claims, 2 Drawing Sheets

OTHER PUBLICATIONS

Kim et al. "Experimental realization of Popper's experiment: Violation of the uncertainly people?". Foundations of physics, vol. 29, No. 12, pp. 1849-1861 (Dec. 1999).*

Geoffrey Hunter, "Realism in the Realized Popper's Experiment", Jul. 1, 2005, Dept of Chemistry, York University, Toronto Canada, M3J 1P3, pp. 1-16.*

Aspect et al. "Experimental test of Bell's inequalities using time-varying analyzers". *Physical Review Letters*, vol. 49, No. 25, pp. 1804-1807 (Dec. 20, 1982).

Redhead. *Incompleteness, Nonlocality, and Realism*. Clarendon Press, Oxford (1987).

Popper. *Quantum Theory and the Schism in Physics*. Routledge (1982).

Hall. "Imprecise measurements and non-locality in quantum mechanics". *Physics Letters A*, vol. 125, No. 2-3, pp. 89-91 (Nov. 2, 1987).

Popper. "Realism in quantum mechanics and a new version of the EPR experiment". In *Open Questions in Quantum Physics*. Tarozzi et al. (Eds.), D. Residel Publishing Company, Dordrecht (1985).

Storey et al. "Measurement-induced diffraction and interference of atoms". *Physical Review Letters*, vol. 68, No. 4, pp. 472-475 (Jan. 27, 1992).

Herbert. "FLASH- A superluminal communicator based upon a new kind of quantum measurement". *Foundations of Physics*, vol. 12, No. 12 (1982).

Kim et al. "Experimental realization of Popper's experiment: Violation of the uncertainly people?". *Foundations of Physics*, vol. 29, No. 12, pp. 1849-1861 (Dec. 1999).

Collett et al. "Analysis of a proposed crucial test of quantum mechanics". *Nature*, vol. 326 (Apr. 16, 1987).

Patent Abstracts of Japan & JP 2000-295173 (Dec. 10, 2002).

Aspect et al. "Experimental tests of realistic local theories via Bell's theorem". *Physical Review Letters*, vol. 47, No. 7, pp. 460-463 (Aug. 17, 1981).

Aspect et a. "Experimental realization of Einstein-Podolsky-Rosen-Bohn *Gedankenexperimient*: A new violation of Bell's inequalities". *Physical Review Letters*, vol. 49, No. 2, pp. 91-94 (Jul. 12, 1982).

Altewischer, E. et al., "Plasmon-assisted transmission of entagled photons," *Nature*, vol. 418, pp. 304-306 (Jul. 18, 2002).

Barnes, W., "Survival of the entangled," *Nature*, vol. 418, pp. 281-282 (Jul. 18, 2002).

Qureshi, T., "Popper's experiment, Cophenhagen Interpretation and Nonlocality," arXiv:quant-ph/0301123 v3, pp. 1-7 (Mar. 30, 2004).

Sample, I. "Quantum entanglement stronger than suspected," *NewScientist.com News Service*, 1 page (Jul. 2002).

Wiseman, H., "From Einstein's Theorem to Bell's Theorem: A History of Quantum Nonlocality," arXiv:quant-ph/0509061 v3, pp. 1-18 (Feb. 8, 2006).

* cited by examiner

METHOD AND SYSTEM FOR BINARY SIGNALING VIA QUANTUM NON-LOCALITY

This application is a continuation of application Ser. No. 10/108,084, filed 26 Mar. 2002 now abandoned, entitled METHOD AND SYSTEM FOR BINARY SIGNALING VIA QUANTUM NON-LOCALITY, which application(s) are incorporated herein by reference.

FIELD OF THE INVENTION

This invention relates to a method of, and system for, binary signalling via quantum non-locality.

The invention is particularly applicable for rapid communication, and in particular superluminal signalling. In this way, the invention has applications for deep space communication. Additionally, the invention is particularly suitable for secret private communication.

BACKGROUND

Since quantum theory's origin with Max Planck a century ago, its implications have created persisting controversy. The interaction of the quantum with the macroscopi worlds remains unclear while its prediction of 'instantaneous action at a distance'—also termed 'nonlocality'—conflicts with the predictions of special relativity that nothing can travel faster than light. The unresolved debates on these issues have created long-standing schisms in physics.

The phenomenon of nonlocality arises from the 'quantum entanglement' between quantum objects that have formerly interacted—even though astronomically large distances may separate these objects. This phenomenon has now been demonstrated repeatedly over the last twenty years, notably by the so-called Aspect Experiment (see Aspect, A., Dalibard, J. and Roger, G., Experimental Tests of Bell's Inequalities Using Time-varying Analyzers, Physical Review Letters 49 (1982) 1804–1807). The Aspect Experiment demonstrated that under some conditions certain atomic species and non-linear down conversion crystals can be induced to emit pairs of photons that are quantum entangled. Quantum entanglement provides that an influence imparted to one quantum particle will produce an effect on the counterpart quantum particle, the arrangement of the Aspect Experiment demonstrating that this effect must travel faster than light. The Aspect Experiment, repeated many times in the last 20 years, violates the Bell Inequalities, an alternative theory expounded by John Bell in the 1960s.

From the radical implications of the Aspect Experiment debate has evolved not merely into two but into three intractable positions—some positions not recognized by others. The three positions, types A, B and C, are outlined below—though only in the roughest sense would they correspond to the three types outlined by Redhead (see Redhead, M., Clarendon Press, 1987).

Upheld by Albert Einstein, Type A, Local Realism (Hidden Variables type II or 'Local Hidden Variables'), asserts that any quantum object has a precise and exact position and momentum simultaneously, in defiance of Heisenberg's Uncertainty Principle. For type A theorists a quantum object is a 'point-particle'. Human observers however are for some reason unable to get around the Uncertainty Principle to discover the exact positions and momenta of the 'locally real' quantum objects.

Type A theorists uphold the Bell Inequalities; their violation by the Aspect Experiment led to John Bell 'defecting' from his espousal of type A local realism. Hence Type A became the losing side in the 'Aspect Wars'. The violation of the Bell Inequalities led to local realist Karl Popper suggesting a more demanding experimental violation for the Bell Inequalities (see Karl Popper, "Quantum Theory and the Schism in Physics", Routledge (1982), pp 27–34).

Upheld by Niels Bohr, Werner Heisenberg & Max Born, Type C, The Copenhagen Interpretation (*Complementarity*), enshrines the Uncertainty Principle as the key feature of the quantum realm—a feature developed into the Principle of Complementarity, also known as 'wave-particle dualism'. For Copenhagenists the Uncertainty Principle implies that in the quantum realm there is no causality; individual quantum objects interact arbitrarily, there being only statistical interactions. However, the statistical equations embodying these interactions do allow for nonlocal interactions.

Type C has become the standard interpretation of quantum theory—quantum mechanics. Less well appreciated is that the Copenhagen Interpretation takes a uncompromisingly mathematical view of the world in the manner of Plato, as Heisenberg reveals when discussing the divisibility of matter, including subatomic particles:

> In attempting continual division we ultimately arrive . . . at mathematical forms: . . . These forms are not themselves matter, but they shape it. (Encounters With Einstein, *What is an Elementary Particle* p. 80). The elementary particles in Plato's *Timaeus* are finally not substance but mathematical forms. . . . In modern quantum theory there can be no doubt that the elementary particles will finally also be mathematical forms, but of a much more complicated nature. (Physics & Philosophy, *Quantum Theory and the Roots of Atomic Science* pp. 59–60).

That quantum mechanics is a mathematically-grounded theory is not adequately appreciated by its many quantum researchers; for example, they make misleading claims as to nonlocal phenomena contradicting the principles of quantum mechanics. Correcting two such misleading claims, Hall refers to the many "impossibility proofs" of quantum mechanics, proofs which deny that nonlocal interactions and phenomena can be used for transmitting information (see M. J. W. Hall, "Imprecise measurements and non-locality in quantum mechanics", pages 89–91, Physics Letters A, vol. 125, no. 2–3, issued 2 Nov. 1987, Elsevier {The Netherlands}).

Concerning the 'impossibility proofs' against transmitting information through nonlocal processes, type A Local Realists concur with type C Copenhagenists, the 'point-particle' philosophy of the former revealing a mathematical philosophical basis differing only in details from the type C interpretation. Indeed, it is common for physicists to 'resolve' their philosophical differences by invoking complementarity—via the wave-particle dualism at the heart of the type C interpretation. In this way the 'wave'—actually a 'probability cloud' rather than a physical object—is reconciled or harmonized with the type A 'point particle'.

Nevertheless, there are a few quantum theorists who have admitted that quantum theory need not be grounded upon a fundamentally mathematical philosophy at all—unlike quantum mechanics. This position is the quantum interpretation given under the umbrella term: the Type B, Nonlocality (Hidden Variables type I or 'Nonlocal Hidden Variables';

In the Type B, Nonlocality (Hidden Variables type I or 'Nonlocal Hidden Variables'), interpretation, the quantum objects have some sort of physical structure—albeit largely unknown. Upheld consistently by only a minority of quantum theorists, the nonlocal interpretation accepts the statistical quantum equations as accurate descriptions of quantum interactions, including the implied nonlocality of quantum interactions.

Pioneered by Dmitri Blokhintsev in the Soviet Union, by David Bohm and Jean-Pierre Vigier in the West, and by plasma theorists in various countries, this alternative uses much mathematics—but only descriptively. Rather than breaking down quantum objects into mathematical entities, they perceive that each quantum object has an internal physical structure, the Western and plasma theorist hypothesizing that a subatomic particle consists of a fluid vortex (e.g. Bohm & Vigier 1954). Hence the importance of the type B interpretation is twofold. First, it allows for a physical basis for interpreting, testing and developing nonlocal interactions. Secondly, the 'impossibility proofs' used to deny the possibility of nonlocal transmission of data no longer apply since they are not physical evidence against nonlocal information transfer but are rather derived from the mathematical formalism underpinning quantum mechanics. These proofs are valid only if one accepts the mathematical philosophies 'grounding' quantum mechanics as found with types A and C.

Confusingly, however, the type B nonlocal quantum interpretation is denied explicit recognition by many theorists and philosophers—including Karl Popper who writes of the 'Hidden Variables Concept' as "highly ambiguous" and one that "can be abandoned without loss" (see Karl Popper, "Realism in quantum mechanics and a new version of the EPR experiment", in "Open Questions in Quantum Physics", edited by G. Tarozzi and A. van der Merwe, published 1985 by D. Reidel (Dordrecht)). Popper's proposal constitutes a method to test his favoured type A local realism against type C complementarity. For Popper, type B interpretations intrude only insofar as they render 'Hidden Variable Theory' ambiguous.

There is a claim, deriving from type C and exploited by Popper (1982), that 'mere knowledge' can create a 'virtual slit' to alter the behaviour of any subatomic particles passing through it. For example, Storey et. al. put forward a scheme to test Popper's assertion as to "whether knowledge alone is sufficient to create uncertainty"—"a virtual slit created by our knowledge from the field measurement of where the atom is". (see P. Storey, M. Collett, and D. Walls, "Measurement-induced diffraction and interference of atoms" Physical Review Letters, vol. 68, no. 4, issued 27 Jan. 1992, The American Physical Society (USA), pages 472–475). The 'virtual slit' in the light field, through which the atom has already passed can be modified through observer mediated actions. "By varying the phase of the field quadrature measured we vary the degree of localization [of the atom] and effectively create an atomic slit of adjustable width." In other words, the authors are choosing to alter the physical conditions under which the atoms pass through the light field hence it is not necessarily the effect of the authors' knowledge alone but may readily be due to their active choice at work in adjusting the measuring devices. —That measurements conducted on quantum objects influence the behaviour of objects is a universally recognized quantum phenomenon.

Hence a reply to the implied assertion that 'knowledge can create a virtual slit' is as follows: the measurement process interferes with the light field and alters the deflection trajectories of the atoms passing through. Here the so-called 'virtual slit' is 'created' or modified by observer actions upon an atom that has already passed through the field. Hence there are varied explanations for the phenomenon—one being that the atom is inherently nonlocal with a resulting direct and instantaneous effect upon the field. Alternatively a type A theory might suggest 'time reversed' effects—i.e. the future controlling the past, or as with the Type C interpretation of Storey et al. that the observers' mere knowledge of the atom's state alters the nature of the field. Clearly, all three explanations are philosophical interpretations.

Yet Popper's preferred type A prediction would, if demonstrated, also lead to the violation of Heisenberg's Uncertainty Principle, a position not implied by type B nonlocality. In type B nonlocal interpretations, the Uncertainty Principle is evidence of a hidden 'body' behind the quantum object, not a point particle or a collection of equations but a dynamic physical object that possesses inherent spatial extension. Furthermore, this as yet little understood dynamism and spatial extension can be utilized by experimenters for practical purposes.

There have been various attempts to elaborate practical implications from quantum theory, although they may display a misunderstanding of physics or unfounded speculation. An example is the Canadian Patent Application No. 2,148,337 (Hrushovetz) where affirmative asides on cold fusion, coincidental sensation and signalling between starfish unfortunately serve only to discredit practical endeavour relating to quantum nonlocal interactions.

There have also been various proposals to exploit quantum entanglement for superluminal communication. In this context, the term 'superluminal' merely means 'faster-than-light' and does not necessarily imply the associated claims of local realism or special relativity. Indeed, it may be found that nonlocal information transfer occurs at speeds slower than light; nonetheless, this would not impact on the terrestrial applications of this signalling method.

An early proposal was presented in an article "FLASH—A Superluminal Communicator Based Upon a New Kind of Quantum Measurement", by Nick Herbert (Foundations of Physics 12 [1982] 1171–1176). The Herbert proposal did not work because of his reliance upon "perfect photon Xeroxing"; in effect, a claim that photons could be cloned in large numbers, their statistical behaviour allowing for the interpretation of a signal by weeding out the noise. Photons cannot be 'cloned' in this manner, the 'laser gain tube' required to produce such perfect clones being impossible to produce physically, as Herbert later admitted, given that his process would violate the Uncertainty Principle.

A more recent proposal is disclosed in U.S. Pat. No. 6,057,541 (Steenblik). The Steenblik proposal would appear to work although it may be rather unwieldy as it involves the production of streams of quantum objects from multiple sources. Steenblik proposes the use of polarization to allow separation of signal information from noise in a correlated photon system for use of such a system for transmission of information. His experiment setup is now readily achievable with present-day technology, demonstrating the nonlocal transfer of information. This seems also the case for the arrangement disclosed in JP2000-295173 (Masanori).

The Steenblik method also operates through quantum entanglement, though there is no mention of the violation of the type A, Principle of Locality (i.e. special relativity) that would result. These quantum entangled nonlocal interactions act instantaneously, faster than light. Nonlocal interactions are termed by Steenblik "non-local quantum correlation events", being represented in U.S. Pat. No. 6,057,541 by symbols (>>>) and (<<<); see table 1 (pages 9–10) and his drawings. That Steenblik's proposal might not seem to violate special relativity is an illusion created by the drawings in which the two steams of quantum objects are running parallel with each other rather than away from each other as with the Aspect Experiment.

It is against this background that the present invention has been developed.

SUMMARY OF THE INVENTION

The present invention provides a method of binary signalling including:
 providing an ensemble of quantum-systems, wherein the quantum-systems are in pairs, with one quantum-system of each pair being in quantum entanglement with the other quantum-system of each pair;
 separating the paired quantum-systems into two subgroups, with the quantum-systems of each pair being in different subgroups;
 selecting the binary signal to be transmitted;
 subjecting the quantum-systems in one subgroup to an influence to enhance scattering of the quantum-systems to an extent corresponding to the binary signal to be transmitted; and
 detecting the extent of correlated scattering in the quantum-systems in the other subgroup, the extent of scattering providing an indication of the particular binary signal transmitted.

The expression 'correlated scattering' as used herein includes spin scatter and momentum scatter.

The quantum-systems may comprise particles or parts of particles.

The influence to which one group of quantum-system pairs is subjected to cause scattering may comprise an aperture through which the quantum-systems are passed to establish interference.

There may be two aperture sizes, one for generating wide scattering and the other for generating forward scattering.

The forward scattering corresponds to one binary signal (for example signal 0) and the wide scattering corresponds to the other binary signal (for example signal 1).

The aperture may comprise a slit.

A means may be provided for selectively varying the size of the slit.

The present invention also provides a system for binary signalling including:
 means for generating an ensemble of quantum-systems, wherein the quantum-systems are in pairs, with one quantum-system of each pair being in quantum entanglement with the other particle of each pair;
 means for separating paired quantum-systems into two subgroups, with the quantum-systems of each pair being in different subgroups;
 means for selecting a binary signal to be transmitted;
 means for subjecting the quantum-systems in one subgroup to an influence to enhance scattering of the quantum-systems; and
 means for detecting the extent of correlated scattering in the quantum-systems in the second subgroup, the extent of scattering providing an indication of the selected binary signal transmitted.

The present invention also provides a system for binary signalling utilising first and second subgroups of quantum particles, the first subgroup comprising a multitude of particles and the second subgroup comprising a multitude of particles each in quantum entanglement with one particle in the first subgroup; the system comprising:
 means for selecting the binary signal to be transmitted;
 means for subjecting the quantum-systems in the subgroup to an influence to enhance scattering of the quantum-systems; and
 means for detecting the extent of correlated scattering in the quantum-systems in the second subgroup, the extent of scattering providing an indication of the selected binary signal transmitted.

BRIEF DESCRIPTION OF THE DRAWINGS

The invention will be better understood by reference to the following description of one specific embodiment thereof, which is described with reference to the accompanying drawings in which.

BEST MODE(S) FOR CARRYING OUT THE INVENTION

Figure 1:
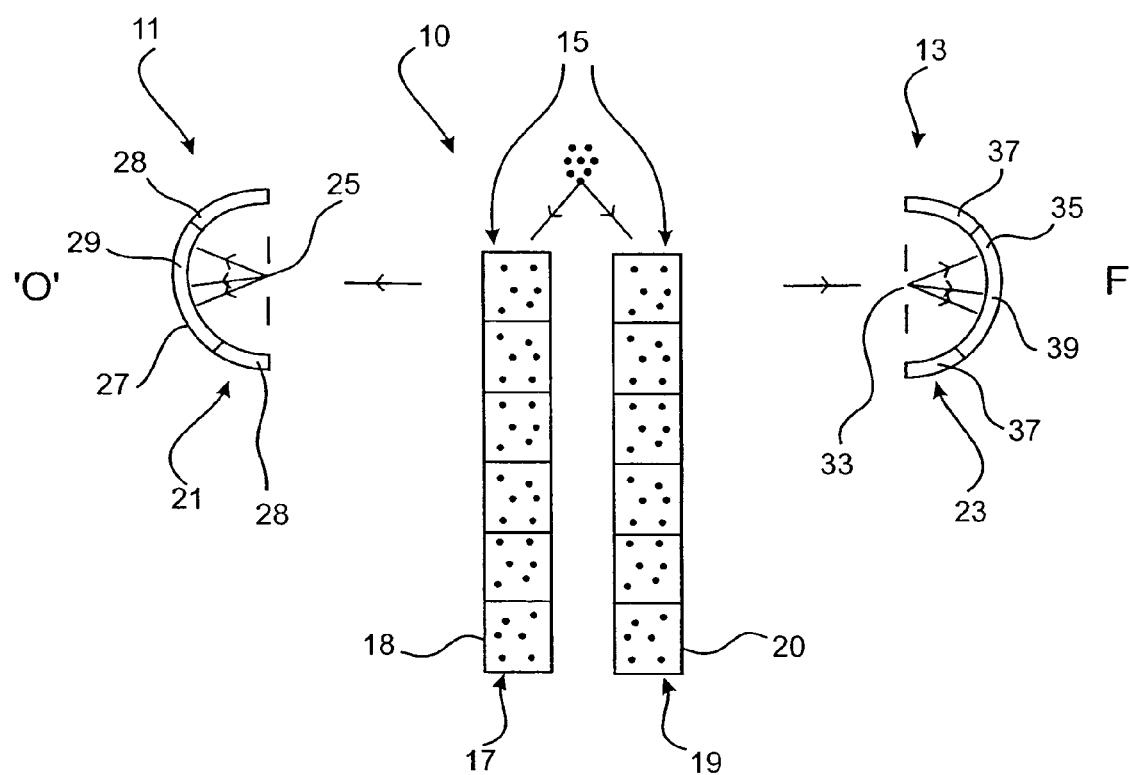
FIG. 1 is a schematic view of a system according to the embodiment transmitting a signal 0.

Referring to the accompanying drawings, there is shown a system 10 for binary signalling. The system 10 involves a sender 11 and a receiver 13, with the sender 11 transmitting a binary signal to the receiver 13.

The signalling system 10 comprises a group 15 of particle-pairs, typically photons. The group of particle pairs is herein referred to as an ensemble. A particle-pair refers to two quantum-entangled particles, such as photons, fermions, atoms, molecules or any combination thereof. One member of each particle-pair will hereinafter be referred to as a "paired particle", and the other member of the pair will be hereinafter referred to as its "partner particle".

The ensemble 15 is divided into two subgroups 17, 19 which herein are referred to as hemiensembles. One hemiensemble 17 contains a multitude of paired particles and the other hemiensemble 19 contains a multitude of their respective partner particles.

Figure 2:
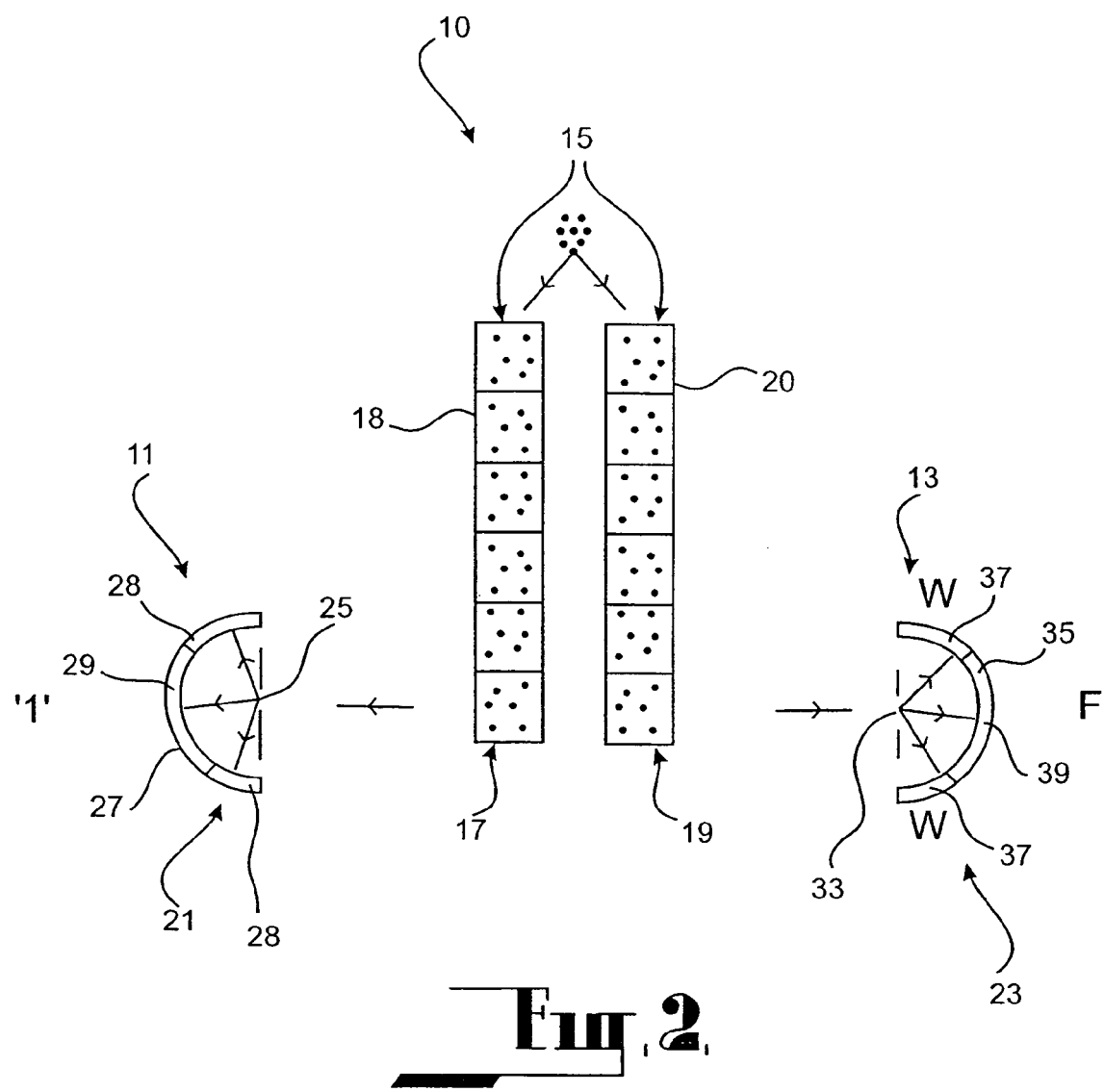
FIG. 2 is a schematic view of a system according to the embodiment transmitting a signal 1.

Binary signalling is achieved by subjecting paired particles in hemiensemble 17 to an influence which causes scattering thereof, either as forward scattering corresponding to a binary signal 0 as illustrated in FIG. 1 or as wide scattering corresponding to a binary signal 1 as illustrated in FIG. 2.

The use of an adequately sized ensemble will ensure that the overall behaviour of the partner particles in the hemiensemble 19 can be probabilistically assessed so as to determined whether forward scattering or wide scattering has been imparted to the paired particles in the hemiensemble 17.

The scattering effect is achieved by use of signal transmitters 21 and signal detectors 23.

The signal transmitters 21 comprise a signalling aperture 25 in the form of a slit and an associated signalling surface 27 incorporating wide scatter detectors 28 and forward scatter detectors 29.

Where a binary signal 0 is to be transmitted, the signalling slit 25 is set as a broad slit, so as to produce forward scatter on the surface 27, as depicted in FIG. 1 of the drawings.

Where a binary signal 1 is to be transmitted, the slit 25 is set as a narrow slit so as to produce wide scattering on the surface 27, as illustrated in FIG. 2 of the drawings.

It will be noted that the signalling slit 25 in the arrangement shown in FIG. 2 is much narrower than the signalling slit 25 in the arrangement shown in FIG. 1.

The signal transmitted by the sender 11 is interpreted by a receiver 13. The interpretation involves subjecting the partner particles in the hemiensemble 19 to a signal detector 23 comprising a detector aperture 33 in the form of a slit and an associated detector surface 35 incorporating wide scatter detectors 37 and forward scatter detectors 39. The detector slit 33 is of a size selected to induce scattering. In this embodiment, the detector slit 33 is a broad slit 33. However, it is not necessary that the detector slit 33 be broader than the signalling slit 25. Rather, different detector slit breadths need to be tested to ascertain the optimum slit breadth. It may be that the breadth of the detector slit will be narrower than either of the broad or narrower signalling slit used by the sender.

The partners of the paired particles, despite passing through the detector slit 33, will collectively demonstrate scattering in correlation with the scattering of their paired particles. In other words, if the paired particles were subjected to forward scatter, the correlated partner particles will probabilistically demonstrate an overall behaviour of forward scattering, as illustrated in FIG. 1. Similarly, if the paired particles were subjected to wide scatter, the partner particles will probabilistically demonstrate an overall behaviour of wide scattering, as illustrated in FIG. 2.

In this embodiment, the detector slit 33 at the receiver 13 is maintained in a broad condition during signal reception so that only changes in the extent of scattering are induced by a change of slit breadth at the sender 11.

Each signal is interpreted by the receiver 13 according to the ratio of particles falling on wide scatter detectors 37 relative to forward scatter detectors 37, all particles deriving from the one hemiensemble 19. Particularly, if more than 50% of the particles fall on a wide scatter detector 37 then the signal would be interpreted as signal 1, and if more than 50% of the particles fall on the forward scatter detector 39 then the signal would be interpreted as signal 0.

Accordingly, it is evident that a signal is transmitted as a measurable influence from one hemiensemble 17 to the other hemiensemble 19. A meaningful signal can be transmitted even if only a small minority of particle-pairs in the ensemble take part.

As an example, presume that use of the broad slit 33 results in less than 5% of photons being scattered onto the wide-scatter detectors 37 and further, that the sender's use of the narrow slit 25 results in 50% scatter onto his own wide-scatter detectors 28. What will be the proportion of photons scattering at the receiver's broad slit when the sender uses the narrow slit?

Whilst only a minority of paired photons—here up to 45%—are involved in inducing scatter in their partner photons, only a small proportion of these need to scatter their partner photons in order that a meaningful signal can be detected by the receiver 13. Within the limits of experimental error, even a 6–10% scatter onto the wide-scatter detectors 37 of the receiver 13 could allow the receiver to measure a meaningful signal as the receiver would be able to determine whether the sender has used the broad or the narrow slit. It is evident that probabilistic considerations based on experiment will be required to establish a suitable "cut-off" percentage for a signal and that the method described above will almost certainly have to be modified depending on experimental findings.

The above considerations also demonstrate that no individual paired particle scattered through a narrow slit can reliably reveal a measurable effect on its partner particle. The influence between the paired particle and its partner particle would, by inference from the Aspect experiment, be variable in its strength, some particle-pairs demonstrating no effect, others an exaggerated effect. The effective signal is purely a statistical one involving a whole ensemble so that no measurable effect of a hypothetical "average scattering property" imputed to an individual particle-pair can be inferred to exist as the ensemble consists of many particle-pairs, each with a variable and unpredictable correlation.

That a signal can be transmitted in an ensemble does not infer that an "average scattering property" with a measurable effect can occur in each particle-pair from a significant proportion of particle-pairs in an ensemble as this would suggest that a signal could be transmitted even by a single particle-pair. The concept of an "average scattering property" is merely an abstract mathematical construct derived from one or more experimental situations so is implicit neither in quantum theory nor through a positive result for this experiment. That an ensemble can transmit a signal does not imply that each of its parts—a particle-pair—can do likewise; to assert otherwise is to misunderstand statistical mechanics as each particle-pair is potentially capable only of contributing to such a signal, if, as the Aspect experiment implies, action-at-a-distance does occur.

In this embodiment, the hemiensembles 17, 19 are stored as paired electrons each on a respective storage device. Specifically, the hemiensembles 17 are stored on a primary storage device 18 (which is used by the sender 11) and the hemiensembles 19 are stored on a counterpart storage device 20 (which is used by the receiver 13). Release of the particles from each storage device 18, 20 is effected by a respective triggering influence such as a blue or ultraviolet laser, an X-ray laser or sound stimulus (e.g. phonons).

Each storage device 18, 20 may take any appropriate form, such as for example a diskette or a crystal array.

The storage devices used to carry entangled particles will necessarily degrade the quantum entanglement. Merely loading the newly entangled hemiensembles onto a storage device will create further entanglements with the particles constituting the storage device (storage materials). Unloading the particles for testing will create still further entanglement; this time with the radiation or particles used to detach the hemiensembles from the storage devices (detaching materials).

Since the loading and unloading of particles from storage devices are probably the major quantum entanglement-degrading activities, minimizing such effects are important. Hence the spin-alignment not just of the quantum-entangled particles but of the particles comprising both the substrate of the storage devices (storage materials) and the detaching radiation or particles (detaching materials) needs to be considered. Loss of quantum entanglements and signal strength would be minimized by controlling the spin alignments of storage and detaching materials. Were the detaching materials comprised of say laser beam radiation, spin alignment (i.e. uniform polarization of the photons,) would be easy to create and control, presumably minimizing the degradation of quantum entanglement.

There is also a need to consider the spin alignment of the storage materials, in particular the surface of the storage materials, in particular the surface of the storage material (which it is envisaged at present would be some sort of solid media e.g. diskette, crystal array). It is most desirable that they be made to exacting standards, though certain coatings or crystal arrays may prove amenable to a spin alignment that binds to test particles with minimal disruption of the quantum entanglement of the test particles.

It is believed that it would not be necessary for the receiver to test the transmitted signal to identify whether it is a signal 0 or a signal 1 immediately after transmission of the signal. In this regard, it is believed that quantum correlation between paired particles could remain for an indefinite period of time (possibly for a year or longer). Accordingly, it will not be necessary for the receiver 13 to test immediately following transmission of a signal by the sender 11.

As there is no obligation for the receiver to test the partner hemiensemble immediately, there may well be a delay between a message encoded by the sender being detection by the receiver. In such circumstances it can be important for ensuring signal quality that the sender, having used an assemblage of hemiensembles to encode a message, subsequently retain these particles in a protective environment until the receiver has tested the partner hemiensembles. This is because further manipulation (deliberate or otherwise) of the sender's assemblage of hemiensembles after the sender has encoded the message could weaken the signal eventually detected by the receiver.

There could, for example, be a situation where the sender's hemiensembles had been tested, with the tested particles (electrons or photons in this example) then becoming part of a detector apparatus or electric circuit thereof. Before the receiver has had an opportunity to test the partner hemiensembles, the sender's detector apparatus and electric circuitry is damaged or destroyed, for instance in a fire. The damage or destruction could disrupt the sender's used test particles in such a manner as to alter the quantum entanglement with the receiver's yet-untested particles. While the signal carried by quantum entanglement may not be entirely disrupted, such radical interference upon the sender's test particles could only be expected to degrade the signal quality in the interim before the receiver tests the partner hemiensembles.

Prior to the particles passing through the signalling slit 25, they may be subjected to a magnetic influence in order to align the polarity of the particles to reduce the number particles required for transmission of each signal. It would then probably be necessary to subject the partner particles to a corresponding magnetic influence prior to their passing through the broad slit 33.

It may be desirable to provide the signalling system 10 with shielding from external electromagnetic fields in order to provide protection for a transmitted signal.

In the embodiment described, a single slit of a physical form has been used to induce scattering. It should be appreciated that any other appropriate arrangement may be used to induce scattering, including multiple slits and apertures of other forms, such as triangular apertures and perhaps pinholes. In each case, the detector surface would be required to be configured so as to be receptive of the scattering induced by the particular aperture.

Furthermore, it may not be necessary for the aperture to be defined by a physically solid structure such as a slit or other aperture. For example, an inhomogeneous magnetic field of an appropriate form may be utilised to induce scattering. With such an arrangement, areas where the field is strong would provide a region of opacity through which the particles cannot pass, and areas where the field is weak would function as an aperture through which particles can pass and be scattered.

As mentioned earlier, the detector slit is of a size selected to induce scattering and need not necessarily be broader than the signalling slit. It is of note that physicists discussing Popper's proposal in the abstract significantly alter his experimental setup—then reveal quite properly that the experiment will not work (see Foundations of Physics, vol. 29, no. 12, issued December 1999, Plenum (USA), Y.-H. Kim and Y. Shih, "Experimental realization of Popper's experiment: violation of the uncertainty principle?"). By removing one of the slits entirely, there is no opportunity for the partners to scatter since there is no slit to trigger the scattering (Kim & Shih p. 1851 FIG. 1b). Fortunately, Kim & Shih have conducted experiments based on Popper's proposal, their FIG. 5 (p. 1855) vividly illustrating the enhanced scatter when the receiver's slit ("Slit B" in their terminology) is present. Similar experiments with the method outlined here will be required, over and above theoretical predictions, to establish the receiver's optimum slit breadth for enhancing scatter and thus signal reception.

Binary signalling by way of the method and apparatus according to the invention may prove suitable for superluminal communication—if the velocity of information transfer is instantaneous or at least faster than light as implied by quantum nonlocality. This may have particular application in outer space where "faster-than-light" communication is highly desirable.

In fact, paired particles and partner particles need not be of the same type; for example, the former may be electrons, the latter photons, with the sender and receiver apparatus being tailored for each type.

Multiple receivers involving multi-particle quantum entanglement is conceivable. However, the multi-particle interactions needed to create essentially equal entanglements would be comparatively difficult to achieve since the cascade of interactions required would create a 'hierarchy' of entanglements. With photon down conversion for example, the original photon would have to be of very high energy, photons used by the receivers being of long wavelengths, the products of repeated down-conversions.

Another variant of quantum signalling is through the use of quantum systems in the form of parts of particle-pairs rather than the whole particle pairs. Quantum theory infers that only parts of particles are required to send a signal. For example, consider the iodine molecule 12 as a particle-pair; two iodine atoms (I.) derived from this molecule would constitute a paired particle and its partner. An ensemble of $I_2$ molecules would constitute a quantum system.

Conversely, a further quantum system of this ensemble would involve quantum entangled particle-pairs comprising only parts of iodine atoms, such as electrons, protons, neutrons or photons derived from the iodine atoms as constituent parts thereof. Furthermore, this relevant quantum system comprises particle-pairs (e.g. an ensemble of electrons), one member of each quantum system particle-pair (i.e. an electron) deriving from each quantum system particle-pair (i.e. the two iodine atoms—paired particle and partner).

That ensembles of $I_2$ molecules could be used for signalling is demonstrated by the successful use of $I_2$ molecules in the known two-slit experiment.

This further implies that if a chemical compound (molecule) is used in the generation of a particle-pair, any quantum systems from the paired particle and its partner can be used for signalling. In the case of a particle-pair comprising two iodine atoms, the quantum systems used for testing could for example be two electrons, two photons or two nucleons (one from each iodine atom). In fact, quantum theory predicts that one need not even test the electrons from the outermost shell through which the two iodine atoms were originally bound. Rather, one could test electrons taken from the inner shells of the two atoms comprising the particle-pair.

While the correlation between quantum systems in the form of parts of particles is probably less than between the original quantum systems in the form of the particle-pairs themselves, there is a compensatory advantage in that the components of the quantum systems comprising parts of particles are lighter (e.g. electrons as against atoms) so that deflection is easier to detect.

Hence the use of chemical compounds as sources fro quantum entanglement greatly enlarges the resource base. For example, ensembles of diatomic molecules of one kind e.g. $O_2$, $H_2O$, could be used; hemiensembles being created by their breakdown into radicals (H., O. HO.) or ions ($H^+$, $OH^-$). Furthermore, quantum entanglement would occur even if the hemiensembles were of a dissimilar chemical or physical composition (e.g. a hemiensemble of $H^+$ ions and a partner-hemiensemble of $OH^-$ ions or electrons). This feature would assist in the transportability of storage materials, the hemiensemble transported to the receiver comprising the chemical component more able to maintain the entanglement during the rigors of transportation.

Thus are there countless types of quantum species that could be used to form particle-pairs—atoms, molecules, short-lived subatomic particles, ions, free radicals, photons and even neutrinos. In the chemical realm there are many thousands of possible candidate molecules to be tested—providing a wide scope for improving the speed and accuracy of these devices.

It is likely that ensembles divisible into multiple constituent 'subensembles' can be created. Rather than just a hemiensemble, two of which comprise an ensemble, constituent subensembles would have multiple members (>2), all of which would be in quantum entanglement. In this way one of the constituent subensembles would be with the sender, the other constituent subensembles distributed among multiple receivers. These constituent ensembles could for example be created from multiple down-conversions of high energy photons or by the breakup or large molecules or giant organic molecules that possess a repetitive structure.

Examples of the latter would be the ring form of sulphur $S_8$, hydrocarbons and polyglycans; these could be broken into their repetitive structural components (sulfur atoms, $CH_2$ radicals and hexoses respectively). A constituent subensemble of such repetitive structural components would constitute a quantum system. If these repetitive structural components themselves were not used to generate a signal, quantum subsystems from the constituent subensembles could be used instead (e.g. electrons derived from sulfur atoms, $CH_2$ radicals and hexoses).

A restriction on the use of multiple entanglement would be the development of further quantum entanglements between some of the multiple constituent subensembles to the exclusion of others, impairing the signal strength found for some receivers as against others. Hence, barring new discoveries, the development of multiple constituent ensembles would seem to have to wait until the development of the method using hemiensembles.

The invention also permits secret communication without monitoring by third parties. The secrecy of the communication is possible because of the use of two hemiensembles to send each bit of data, one containing paired particles and the other containing partner particles. It is necessary for the sender of a communication to have access to one hemiensemble and the receiver of the transmission to have access to the other hemiensemble in order to interpret the communication under transmission. Accordingly, intervention of a transmitted signal by a third party would not enable interpretation of the signal in the absence of correlated particles. Correlated particles could only be obtained through an ensemble generator and thus the security risk is minimised as it is localised to the issue of ensemble generation. Furthermore, a transmitted signal is not broadcast and so would be invulnerable to interception. In consequence, signal encryption is superfluous unless the third party has access to the ensemble generator, sender and/or receiver.

Because the signalling system and method according to the invention do not utilise electromagnetic radiation, they avoid the concern that electromagnetic radiation may have harmful effects such as inducement of cancer.

Signal noise impairing quantum interactions with signalling system and method may be reduced cryogenically, by lowering the temperature of the devices and storage materials to a practical temperature range—probably to below 0° C., perhaps to just below the boiling point of nitrogen.

It should be appreciated that the scope of the invention is not limited to the scope of the embodiment described.

Throughout the specification, unless the context requires otherwise, the word "comprise" or variations such as "comprises" or "comprising", will be understood to imply the inclusion of a stated integer or group of integers but not the exclusion of any other integer or group of integers.

The invention claimed is:

1. A method of binary signaling including:
providing an ensemble of quantum-systems, wherein the quantum-systems are in pairs, with one quantum-system of each pair being in quantum entanglement with the other quantum system of each pair;
separating the paired quantum-systems into two subgroups, with the quantum-systems of each pair being in different subgroups;
selecting the binary signal to be transmitted;
subjecting the quantum-systems in one subgroup to an influence to enhance scattering of the quantum-systems to an extent corresponding to the binary signal to be transmitted; and
detecting the extent of correlated scattering in the quantum-systems in the other subgroup, the extent of scattering providing an indication of the particular binary signal transmitted;
wherein the influence to which one group of quantum-system pairs is subjected to cause scattering comprises an aperture through which the quantum-systems are passed to establish interference.

2. A method according to claim 1 wherein there are two aperture sizes, one for generating wide scattering and the other for generating forward scattering.

3. A method according to claim 2 wherein the forward scattering corresponds to one binary signal and the wide scattering corresponds to the other binary signal.

4. A method according to claim 1 wherein the aperture comprises a slit.

5. A method according to claim 1 wherein detecting the extent of correlated scattering involves subjecting the quantum systems in the other subgroup to a detector aperture.

6. A method according to claim 1 wherein the quantum-systems in said one subgroup are stored on one storage device and the quantum-systems in said other subgroup are stored on a counterpart storage device.

7. A method according to claim 6 further comprising the step of subjecting the quantum-systems stored on said one storage device to a triggering influence to cause release thereof from the storage device.

8. A method according to claim 7 further comprising the subsequent step of subjecting the quantum-systems stored on said counterpart storage device to a triggering influence to cause release thereof from the storage device.

9. A method according to claim 7 wherein said triggering influence comprises a blue or ultraviolet laser or an X-ray laser.

10. A method according to claim 1 wherein the quantum-systems in each sub-group are subjected to a magnetic influence prior to scattering thereof for aligning the polarity of the quantum-systems.

11. A method of binary signaling including:
providing an ensemble of particles, wherein the particles are in pairs, with one particle of each pair being in quantum entanglement with the other particle of each pair;
separating the paired particles into two subgroups, with the particles of each pair being in different subgroups;
selecting the binary signal to be transmitted;
subjecting the particles in one subgroup to an influence to enhance the scattering of the particles to an extent corresponding to the binary signal to be transmitted; and
detecting the extent of correlated scattering in the particles in the other subgroup, the extent of scattering providing an indication of the particular binary signal transmitted;
wherein the influence to which one group of quantum-system pairs is subjected to cause scattering comprises an aperture through which the quantum-systems are passed to establish interference.

12. A system for binary signaling including:
means for generating an ensemble of quantum-systems, wherein the quantum-systems are in pairs, with one quantum-system of each pair being in quantum entanglement with the other quantum-system of each pair;
means for separating paired quantum-systems into two subgroups, with the quantum-systems of each pair being in different subgroups;
means for selecting a binary signal to be transmitted;
means for subjecting the quantum-systems in one subgroup to an influence to enhance scattering of the quantum-systems; and
means for detecting the extent of correlated scattering in the quantum-systems in the second subgroup, the extent of scattering providing an indication of the selected binary signal transmitted;
wherein the influence to which one group of quantum-system pairs is subjected to cause scattering comprises an aperture through which the quantum-systems are passed to establish interference.

13. A system according to claim 12 wherein said means for subjecting the quantum-systems in one subgroup to an influence to enhance scattering thereof comprises an aperture through which the quantum-systems are passed to establish interference.

14. A system according to claim 13 wherein the aperture is of a size for generating wide scattering.

15. A system according to claim 13 wherein the aperture is of a size for generating forward scattering.

16. A system according to claim 13 wherein the aperture is selectively adjustable between two aperture sizes, one for generating wide scattering and the other for generating forward scattering.

17. A system according to claim 13 wherein the aperture comprises a slit.

18. A system according to claim 13 wherein the detection means comprises a detector aperture.

19. A system according to claim 12 further comprising a primary storage device for storing the quantum-systems in said one subgroup, and a counterpart storage device for storing the quantum-systems in said other subgroup.

20. A system according to claim 19 wherein each storage device comprises solid media such as a diskette or a crystal array.

21. A system according to claim 20 further comprising a primary triggering means for subjecting the quantum-systems stored on said primary storage device to a triggering influence to cause release thereof from the storage device.

22. A system according to claim 21 further comprising a counterpart triggering means for subjecting the quantum-systems stored on said counterpart storage device to a triggering influence to cause release thereof from the storage device.

23. A system according to claim 21 wherein said triggering means comprises a blue laser, an ultraviolet laser or an X-ray laser.

24. A system according to claim 12 further comprising means operable to subject the quantum-systems in each sub-group to a magnetic influence prior to scattering thereof for aligning the polarity of the quantum-systems.

25. A system for binary signaling utilizing first and second subgroups of the quantum-systems, the first subgroup comprising a multitude of quantum-systems and the second subgroup comprising a multitude of quantum-systems each in quantum entanglement with one quantum-system in the first subgroup; the system comprising:
means for selecting the binary signal to be transmitted;
means for subjecting the quantum-systems in the subgroup to an influence to enhance scattering of the quantum-systems; and
means for detecting the extent of correlated scattering in the quantum-systems in the second subgroup, the extent of scattering providing an indication of the selected binary signal transmitted;
wherein the influence to which one group of quantum-system pairs is subjected to cause scattering comprises an aperture through which the quantum-systems are passed to establish interference.

26. A system for binary signaling utilizing first and second subgroups of quantum-particles, the first subgroup comprising a multitude of particles and the second subgroup comprising a multitude of particles each in quantum entanglement with one quantum-system in the first subgroup; the system comprising:
means for selecting the binary signal to be transmitted;
means for subjecting the particles in the subgroup to an influence to enhance scattering of the particles; and
means for detecting the extent of correlated scattering in the particles in the second subgroup, the extent of scattering providing an indication of the selected binary signal transmitted;
wherein the influence to which one group of quantum-system pairs is subjected to cause scattering comprises an aperture through which the quantum-systems are passed to establish interference.

27. A method according to claim 8 wherein said triggering influence comprises a blue or ultraviolet laser or an X-ray laser.

28. A method according to claim 22 wherein said triggering means comprises a blue or ultraviolet laser or an X-ray laser.

* * * * *